(12) United States Patent
Cui et al.

(10) Patent No.: US 12,469,373 B2
(45) Date of Patent: *Nov. 11, 2025

(54) DOOR MONITORING SYSTEM AND METHOD

(71) Applicant: CornellCookson, LLC, Mountain Top, PA (US)

(72) Inventors: Xin Cui, Tempe, AZ (US); Ryan Carroll, Phoenix, AZ (US); Bruce Burwell, Mountain Top, PA (US); Zhizhuo Wu, Tempe, AZ (US)

(73) Assignee: CornellCookson, LLC, Mountain Top, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/412,984

(22) Filed: Jan. 15, 2024

(65) Prior Publication Data

US 2024/0153364 A1    May 9, 2024

Related U.S. Application Data

(63) Continuation of application No. 17/746,110, filed on May 17, 2022, now Pat. No. 11,875,655, which is a
(Continued)

(51) Int. Cl.
*G08B 13/08*    (2006.01)
*E05B 47/00*    (2006.01)
(Continued)

(52) U.S. Cl.
CPC .......... *G08B 13/08* (2013.01); *E05B 47/0012* (2013.01); *E06B 5/11* (2013.01); *G08B 25/00* (2013.01)

(58) Field of Classification Search
CPC ........ G08C 19/16; G07C 9/00; G07C 9/0309; E05B 47/00; E05B 47/0012
See application file for complete search history.

(56) References Cited

U.S. PATENT DOCUMENTS

| 11,002,061 B1 | 5/2021 | Maiga |
| 2004/0113778 A1 | 6/2004 | Script |

(Continued)

FOREIGN PATENT DOCUMENTS

CN    113417537 A    9/2021

OTHER PUBLICATIONS

International Search Report and Written Opinion mailed in corresponding PCT Application No. PCT/US2021/061985 dated Jan. 10, 2022, 9 pages.

(Continued)

*Primary Examiner* — Van T Trieu

(57) ABSTRACT

In example implementations, a door monitoring sensor is provided. The door monitoring sensor includes a communication interface to transmit an alarm when a door operates outside of operational parameters of the door, an angular sensor to measure rotational movement of the a door, a movement sensor to detect movement along an x-y-z coordinate plane, a radar sensor to detect an object, a rechargeable power supply to provide power to the angular sensor, the movement sensor, and the radar sensor, and a processor. The processor is communicatively coupled to the communication interface, the angular sensor, the movement sensor, and the radar sensor. The processor is to determine that the door is moving outside of the operational parameters of the door and generate the alarm that is transmitted by the communication interface in response to determination that the door is moving outside of the operational parameters of the door.

15 Claims, 8 Drawing Sheets

Related U.S. Application Data continuation of application No. 17/114,603, filed on Dec. 8, 2020, now Pat. No. 11,354,988.

(51) Int. Cl.
*E06B 5/11* (2006.01)
*G08B 25/00* (2006.01)

(56) References Cited

U.S. PATENT DOCUMENTS

| | | |
|---|---|---|
| 2010/0302025 A1 | 12/2010 | Script |
| 2013/0009785 A1 | 1/2013 | Finn |
| 2020/0115948 A1 | 4/2020 | Lietz |
| 2021/0090427 A1 | 3/2021 | Hass |

OTHER PUBLICATIONS

NPL Search (Mar. 31, 2023).

DOOR MONITORING SYSTEM AND METHOD

CROSS REFERENCE TO RELATED APPLICATIONS

This application is a continuation of U.S. patent application Ser. No. 17/746,110, filed on May 17, 2022, now U.S. Pat. No. 11,875,655, which is a continuation of U.S. patent application Ser. No. 17/114,603, filed on Dec. 8, 2020, now U.S. Pat. No. 11,354,988; both of which are hereby incorporated by reference in their entirety.

BACKGROUND

Doors can be installed at various locations within different buildings. Some doors may be doors that can be opened vertically and are used to allow vehicles to move in and out of the building. For example, the doors may move vertically along a track or may be rolled around a barrel when opened. Other doors can move horizontally in a side coiling door.

Doors can eventually fail after repetitive use. For example, the doors may eventually become crooked, bend from collisions with equipment or vehicles, and so forth. Damaged doors can become stuck or fail to open or close completely. This may create a safety issue.

In addition, doors can operate differently in different locations. For example, some doors may experience different environmental forces than other doors. Some doors may be located on different types of tracks and may move at different speeds. Some doors may be installed on flooring that is not level.

DETAILED DESCRIPTION

Figure 1:
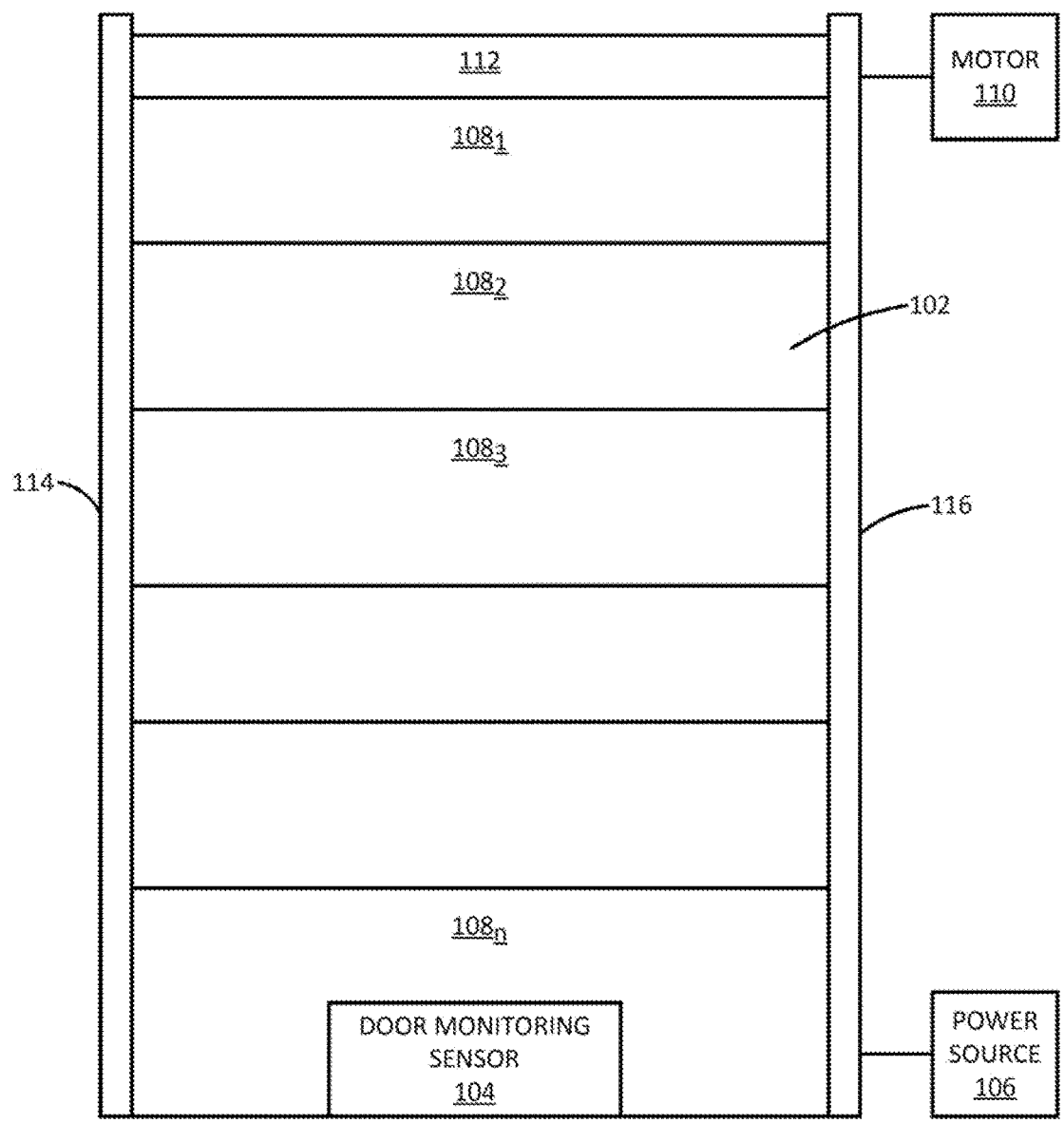
FIG. 1 illustrates a block diagram of a door with an example door monitoring system of the present disclosure.

Examples described herein provide examples of a door monitoring system and method to monitor the installation quality and operation of doors. As discussed above, doors can eventually fail after repetitive use for a variety of different reasons. Thus, monitoring the safe operation of a door may prevent additional costs by correcting any operational errors before further damage occurs to the door. In addition, monitoring the safe operation of the door may prevent injuries to people or damage to vehicles that may go through the door.

Also, as noted above, doors can operate differently in different locations. For example, some doors may experience different environmental forces than other doors. Some doors may be located on different types of tracks and may move at different speeds. Some doors may be installed on flooring that is not level. Thus, monitoring all doors within the same operating parameters may cause false positive errors with some doors that may actually be operating properly.

The disclosed door monitoring system and method may monitor a variety of different movements to detect whether a door is operating properly. The door monitoring sensor of the present disclosure may create safe operational parameters that are associated with a particular door. In other words, the door monitoring system of the present disclosure may monitor whether a particular door is operating properly within the operational parameters of that particular door. The operational parameters of one door may be different from operational parameters of another door.

In addition, the door monitoring sensor of the present disclosure may use a variety of different types of sensors to measure movement in an x, y, z direction as well as rotational movements of roll, pitch, and yaw. The monitoring of these various movements may help to detect improper movements that may be caused by objects, wind force, broken components, and the like. In response, the door monitoring sensor may trigger an alarm or send a communication to a central monitoring device or system.

In some embodiments, the door monitoring sensor may be programmed to detect a certain combination of movements for a particular door. For example, the door monitoring sensor may measure movement along an x-axis in combination with roll and yaw together for analysis.

In an example, the door monitoring sensor of the present disclosure may also have a battery recharging system. As a result, a customer may not have to worry about replacing batteries on the door monitoring sensor. The recharging system may also allow the door monitoring sensor to include more powerful sensors, like radar sensors, that consume large amounts of battery life that would otherwise not be possible.

Lastly, some sensors of the door monitoring sensor may be used during installation to ensure that the door is installed properly. For example, a leveling sensor in the door monitoring sensor may be used to ensure that the door barrel is installed properly and leveled before deploying the door for operation.

FIG. 1 illustrates an example door monitoring system 100 of the present disclosure. In an example, the door monitoring system 100 may include a door 102 that includes a door monitoring sensor 104. In an example, the door 102 may be a vertically opening door that moves vertically up and down along opposing tracks 114 and 116. For example, the door 102 may include a plurality of panels $108_1$ to $108_n$ (hereinafter also referred to individually as a panel 108 or collectively as panels 108). The panels 108 may include wheels that roll inside of the tracks 114 and 116.

In an example, the panels 108 may be flexible such that the door 102 may be rolled around a door barrel 112. The door barrel 112 may be rotated by a motor 110. The motor 110 may be controlled by a controller that includes a processor (not shown) to control operation of the motor 110 in response to inputs to open and close the door 102.

In another example, the panels 108 may move up the tracks 114 and 116 and rest along a horizontal portion of the tracks 114 and 116 that are located above the floor and parallel to the floor. In another example, the door 102 may be a flexible material without the panels 108 that can be rolled around the door barrel 112. In yet another example, the door 102 may be a grille, or any other barrier that can be moved to cover an opening to a building.

In an example, the door 102 may be located in a warehouse or a building. The door 102 may experience a variety of different forces that may affect the ability of the door 102 to properly open and close. For example, high winds can cause the door 102 to bow, bend, rotate, and the like. The force from the wind can cause the door 102 to get stuck or prevent the door from being able to open and close. In an example, a vehicle may crash into the door, damaging a panel 108 and causing the panel 108 to not run inside of the tracks 114 and 116 properly. For example, the damaged panel 108 may be bent or may sit crooked relative to the other panels 108 of the door 102. In another example, an object may be left under the door 102 and may damage the door 102 if the door 102 is shut on top of the object.

In an example, the door monitoring sensor 104 may measure a variety of different movements of the door 102 to determine if the door 102 is operating correctly. If the door 102 is not operating correctly, the door monitoring sensor may generate an alarm and/or transmit a notification to a central monitoring system.

In an example, the door monitoring sensor 104 may include a variety of different types of sensors to measure various movements and rotations of the door 102. The door monitoring sensor 104 may include a rechargeable battery that can be charted by a power source 106. The power source 106 may recharge the battery when the door 102 is closed (or open depending on the location of the door monitoring sensor 104). As a result, the door monitoring sensor 104 may include more powerful types of sensors that were not previously used for door monitoring systems (e.g., a radar sensor).

In addition, the door monitoring sensor 104 may learn the operating parameters of the door 102 and monitor operation of the door 102 within those operating parameters. For example, different doors may operate differently. For example, some doors may rest on an uneven floor. Thus, when the door is closed, the bottom of the door may not rest flat or may be angled. Some doors may experience some amount of vibration when closing due to worn tracks. Some doors may experience some amount of rotation due to constant wind forces, where other doors may be deployed in calm environments that do not experience as much wind forces. Some doors may have a sloping bottom bar from top to bottom. The door monitoring sensor 104 may learn the default sloping angle and set the angle as "level".

The door monitoring sensor 104 may learn these variations in operating parameters for a particular door and may monitor the door within the operating parameters that may be unique to the particular door. In other words, the measurement of different movements for a first door may indicate that the door is operating correctly. However, the same measurements of different movements for a second door may indicate that the second door is not operating correctly.

In addition, the door monitoring sensor 104 may modify or update the door operating parameters for the door 102 periodically over time. For example, the door 102 may be damaged and may vibrate more. Rather than buying a new door, a customer may simply update the door operating parameters to account for the additional vibration when the operation of the door 102 is monitored.

In one embodiment, the door monitoring sensor 104 may also be used for security. For example, the door monitoring sensor 104 may detect when the door is being forcibly opened from below in a closed position. For example, a level sensor may detect an uneven movement, a movement sensor may detect a sudden movement upwards that is outside of the operational parameters, and the like. The door monitoring sensor 104 may then generate an alarm or notify a central monitoring system of a potential intrusion. The details of the level sensor and movement sensor, as well as other types of sensors, of the door monitoring sensor 104 are discussed in further details below.

Although the door monitoring sensor 104 is illustrated as being on a bottom panel 108 of the door 102, it should be noted that the door monitoring sensor 104 may be located on any panel or location (e.g., the top, a side, in the middle, and the like). In addition, although a single door monitoring sensor 104 is illustrated in FIG. 1, it should be noted that any number of door monitoring sensors 104 may be deployed.

Figure 2:
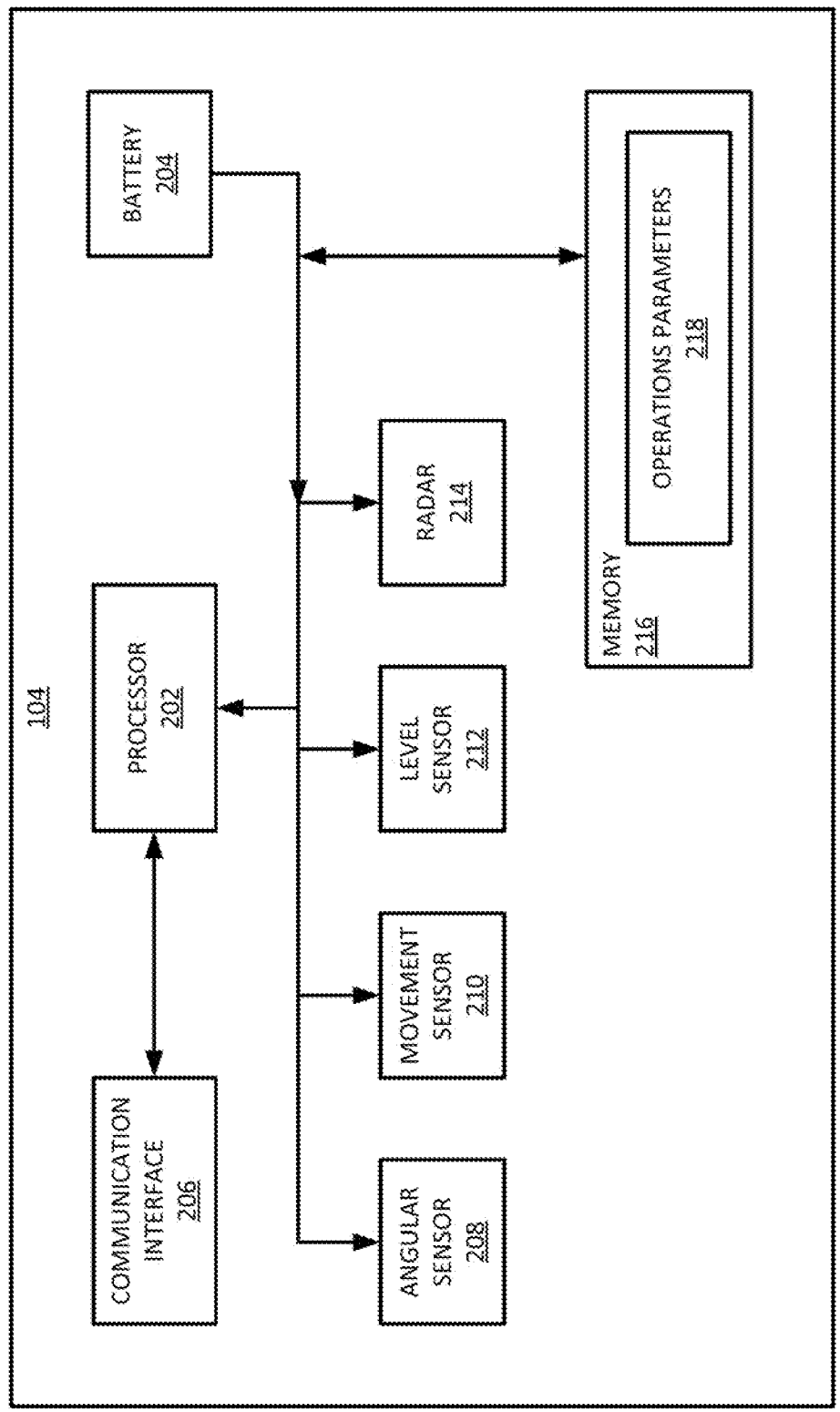
FIG. 2 is a block diagram of an example door monitoring sensor of the present disclosure.

FIG. 2 illustrates a block diagram of the door monitoring sensor 104 of the present disclosure. The door monitoring sensor 104 may include a processor 202, a battery 204, a communication interface 206, a plurality of sensors 208, 210, 212, and 214, and a memory 216. The processor 202 may be communicatively coupled to the communication interface 206, the plurality of sensors 208, 210, 212, and 214, and the memory 216. The processor 202 may be a solid state integrated circuit or application specific integrated circuit (ASIC) processor.

In an example, the communication interface 206 may be a wired or wireless communication interface. The communication interface 206 may communicate over a local area network (e.g., WiFi, Bluetooth, Zigbee, and the like) or over a wide area network (e.g., cellular communications). The communication interface 206 may establish a communication path with a monitoring system (not shown). The monitoring system may be a central controller or a master controller that may communicate with a plurality of different door monitoring sensors 104 in a warehouse and/or other wireless sensors.

In one embodiment, the door monitoring sensor 104 may include firmware that is stored in the memory 216. The communication interface 206 may allow the door monitoring sensor 104 to communicate with the monitoring system or another server to update firmware over a communication network.

The monitoring system may receive alarms and/or notifications from the door monitoring sensor 104. As a result, the technician may see the alarm and try to fix the door 102 and clear the alarm. The notification may include the values of the measurements taken by the sensors 208, 210, 212, and 214, suggested corrections based on the measurements (e.g., remove object, track out of alignment, wait to operate door due to high winds, and the like), an identification of the door 102 that triggered the alarm, and the like.

In an example, the battery 204 may provide power to the sensors 208, 210, 212, and 214. The battery 204 may be rechargeable. For example, the housing of the door monitoring sensor 104 may have contacts that may electrically connect to the contacts of the power source 106. When the door 102 is in a desired position (e.g., closed as illustrated in FIG. 1), the contacts of the battery 204 and the contacts of the power source 106 may connect to recharge the battery 204.

Figure 3:
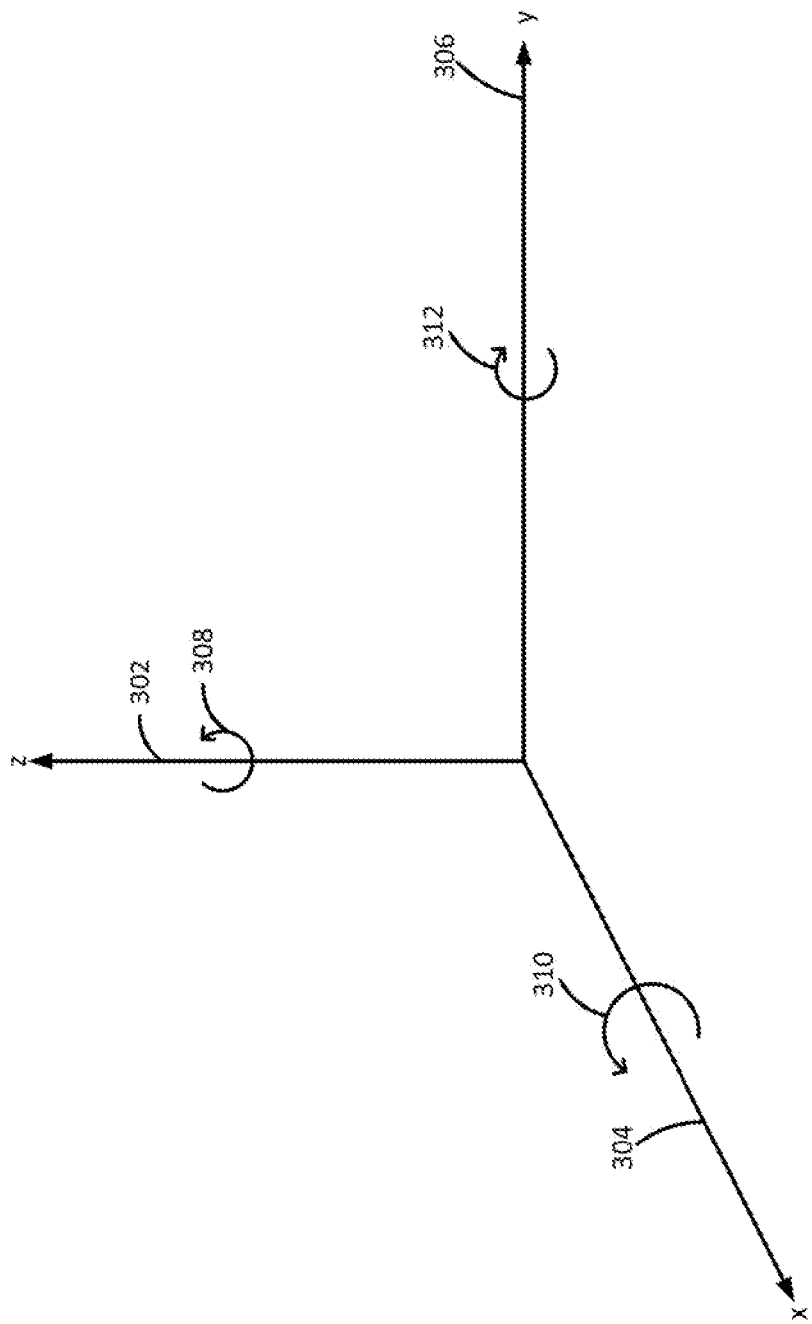
FIG. 3 is a block diagram illustrating an example of the six degrees of movement measured by the door monitoring sensor of the present disclosure.

In an example, the sensors 208, 210, 212, and 214 may provide measurements for a plurality of different movements of the door 102. In an example, the sensors 208, 210, 212, and 214 may provide measurements for six different movements of the door 102. FIG. 3 illustrates the different movements that can be measured.

In an example, the sensors 208, 210, 212, and 214 may measure movements along x-y-z coordinate system, as shown by the axis 300 in FIG. 3. In other words, one or more of the sensors 208, 210, 212, and 214 may measure linear movement along a z-axis 302, along an x-axis 304, and along a y-axis 306. In addition, one or more of the sensors 208, 210, 212, and 214 may measure rotational movements. The rotation movements may include yaw 308 around the z-axis 302, pitch 310 around the x-axis 304, and roll 312 around the y-axis 306.

Referring back to FIG. 2, the sensor 208 may be an angular sensor, the sensor 210 may be a movement sensor, the sensor 212 may be a level sensor, and the sensor 214 may be a radar sensor. The angular sensor 208 may measure rotational movements. For example, the angular sensor 208 can measure the pitch 310, the roll 312, and the yaw 308. The angular sensor 208 may measure rotation as an angular measurement from a position that is initialized at 0 degrees. For example, when the door 102 is installed, the resting position of the door 102 when the door is closed may be set to 0 degrees. The amount of pitch 310, roll 312, and yaw 308 from this position may be measured in degrees of rotation from the resting position of 0 degrees.

Figure 4:
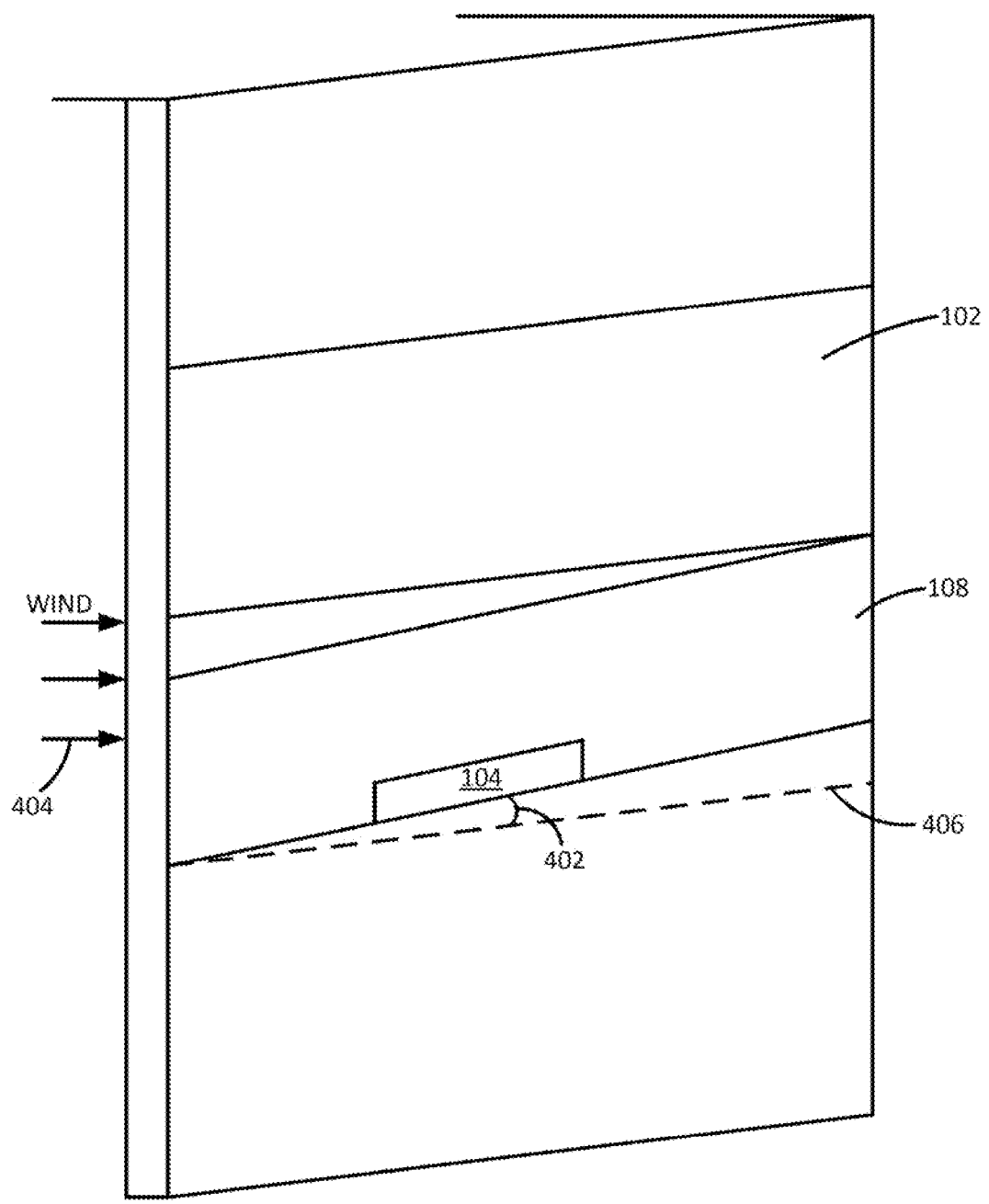
FIG. 4 is a block diagram of the example door monitoring sensor of the present disclosure detecting various forces.

FIG. 4 illustrates an example where wind 404 may apply force against the door panels 108 of the door 102. The wind 404 may cause the door 102 to bow slightly or rotate in a direction that the wind 404 is pushing against the door 102. The rotation caused by the wind 404 may be measured by the angular sensor 208.

In an example, the movement sensor 210 may measure linear movement along the z-axis 302, the x-axis 304, and the y-axis 306. The movement sensor 210 may be a gyroscopic sensor or an accelerometer. The movement sensor 210 can measure a velocity and/or acceleration of the door 102 as well as the distance that the door 102 is moving along the z-axis 302, the x-axis 304, and the y-axis 306.

For example, referring back to FIG. 4, the wind 404 may push the door to the right. The movement sensor 210 may measure the distance that the door 102 is moved along the y-axis 306.

In an example, the level sensor 212 may detect whether a bottom bar (e.g., a bottom surface on the bottom most panel $108_n$ of the door 102) is level. Referring back to FIG. 4, the bottom panel 108 may be angled from a level position 406 illustrated by dashed lines. An angle 402 formed by the bottom of the panel 108 to the level position 406 may be measured by the level sensor 212. The level sensor 212 may be set to "level" when the door 102 is installed. For example, some floors on some entrances may not be perfectly flat. Thus, the "level" may actually be slightly angled for some doors.

Figure 5:
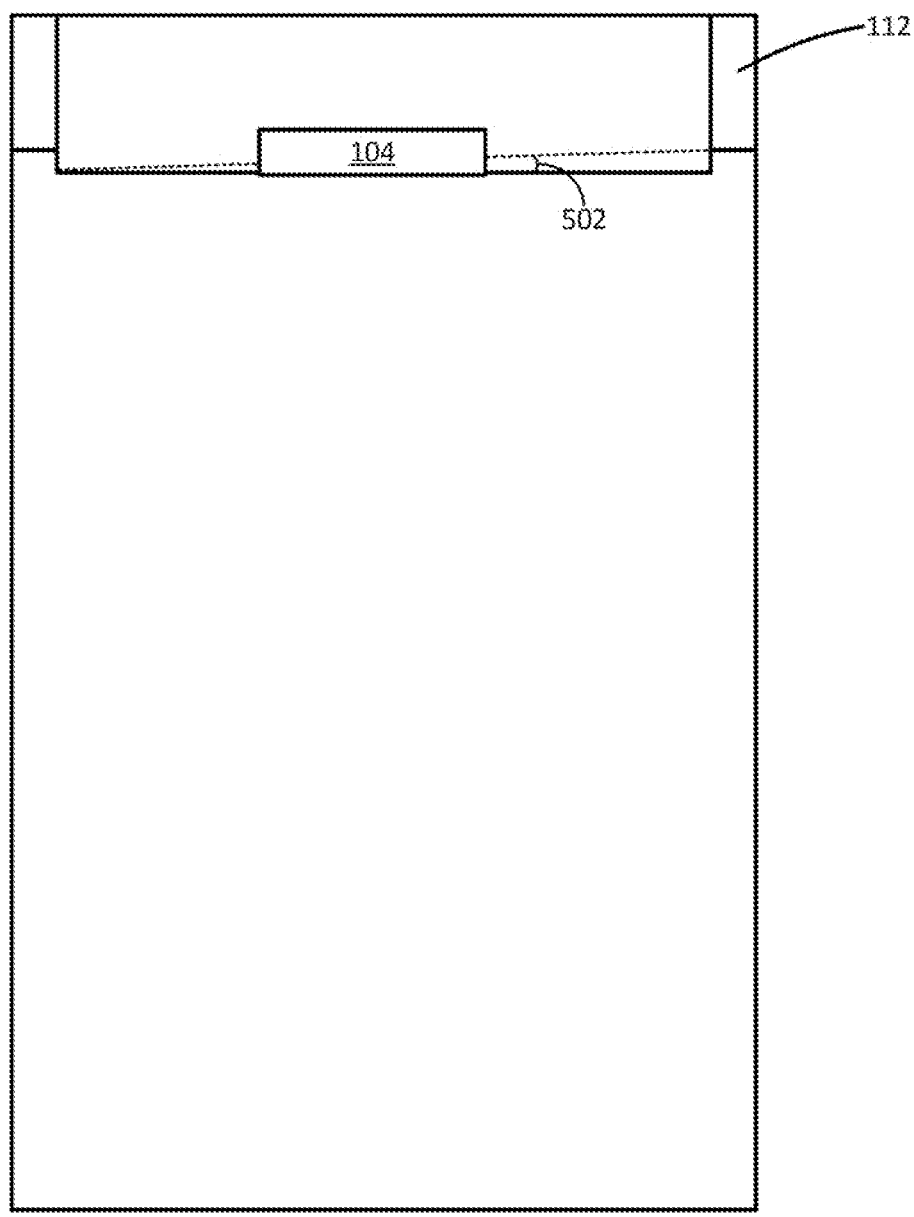
FIG. 5 is a block diagram of the example door monitoring sensor used during an installation of a door barrel of the present disclosure.

In addition, the level sensor 212 may be used to calibrate other components of the door 102 during installation. FIG. 5 illustrates an example where the level sensor 212 of the door monitoring sensor 104 may be used to level the door barrel 112 during installation. For example, the door 102 may be moved to an open position and wrapped around the door barrel 112. The level sensor 212 may measure if the door barrel 112 is level and properly installed. As illustrated in FIG. 5, if the door barrel 112 was uneven, the door barrel 112 may cause the door 112 to roll around the door barrel 112. This may cause the bottom of the door 102 to be at an angle 502 illustrated by the dashed lines. The level sensor 212 may detect this angle 502 and adjustments may be made to the door barrel 112 until the door barrel 112 is level.

In an example, the radar sensor 214 may detect objects within the path of the door 102. The radar sensor 214 may prevent the door 102 from accidentally closing on a person, object, vehicle, and the like, that may cause injury or damage to equipment.

As noted above, the sensors 208, 210, 212, and 214 may measure various movements of the door 102 and compare the measured movements to operational parameters 218 stored in the memory 216. When any of the measured movements fall outside of the operational parameters 218, the processor 202 may generate an alarm and/or transmit a notification to a central monitoring system, as described above.

In an example, the operational parameters 218 may define acceptable ranges of movement along the z-axis 302, the x-axis 304, and the y-axis 306, as well as pitch 310, roll 312, and yaw 308. The operational parameters 218 may be associated with different positions of the door 102. For example, the operational parameters 218 may have values when the door is fully opened, when the door is closed, when the door is moving between open and closed or closed to open, and so forth.

In an example, the operational parameters 218 may be defined for the door 102 during an initialization process. For example, after the door 102 is properly installed, the door monitoring sensor 104 may collect data from door 102. The door 102 may be cycled open and closed several times to allow the door monitoring sensor 104 to measure movement along the z-axis 302, the x-axis 304, and the y-axis 306, as well as pitch 310, roll 312, and yaw 308. The average values of each movement may be calculated with a desired range. In an example, the range may include a low value and a high value that are measured for each movement. In an example, the range may include a standard deviation above and below the average value calculated for each movement.

As noted above, the operational parameters 218 may be different for each door 102 that is installed. For example, some doors may be installed in windy locations where large amounts of wind may cause large movements in the y-axis, roll, and yaw. Some doors may be installed where large machinery operate, causing vibration. The vibration may cause movement along the x-axis, and the y-axis, as well as some rotation in the pitch, roll, and yaw.

In addition, the operational parameters 218 may be updated periodically over time. For example, as parts on the panel 108 or the tracks 114 and 116 become worn, the door 102 may vibrate more over time. This may cause continuous alarms to be generated. Thus, the operational parameters 218 may be updated periodically to account for the increased vibration as part of the "normal" operation of the door.

Figure 6:
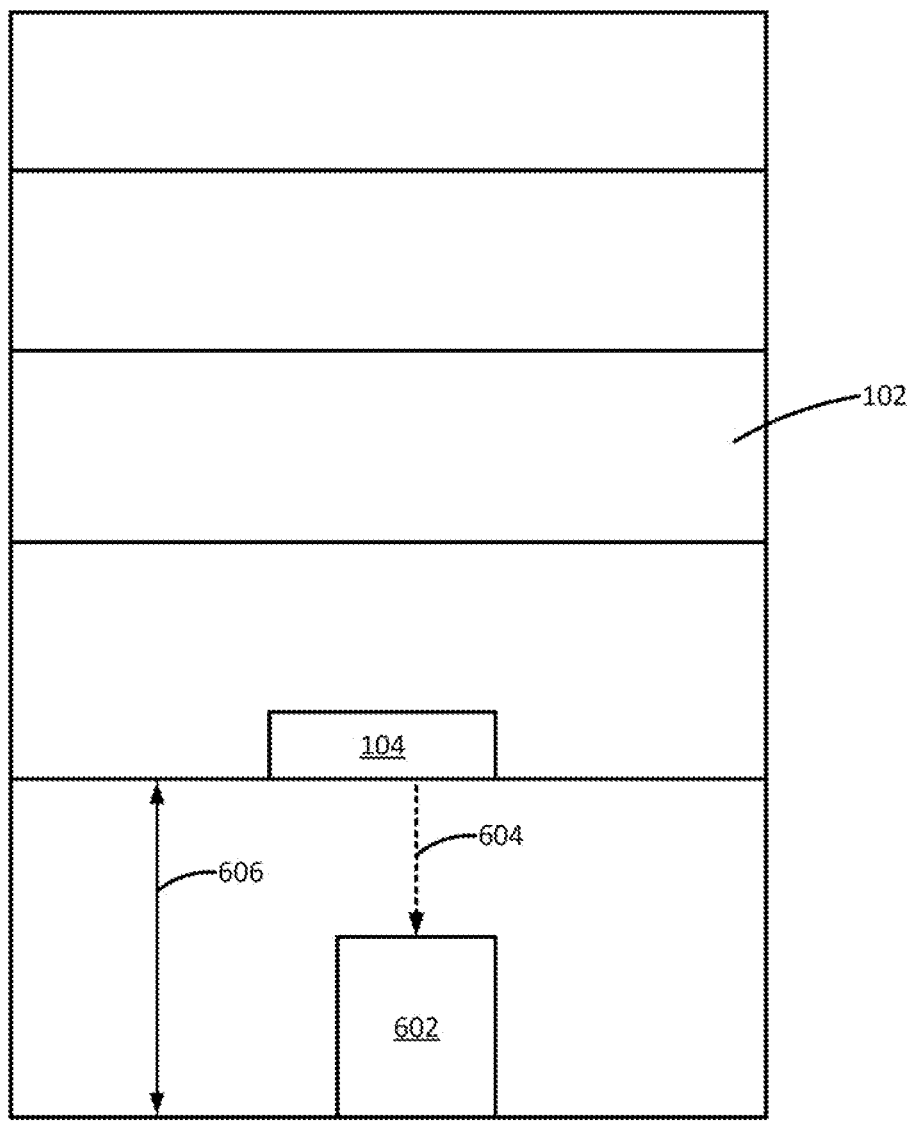
FIG. 6 is a block diagram of the example door monitoring sensor of the present disclosure detecting an object.

In an example, the operation parameters 218 may also include known travel distance to be open and/or closed, an average velocity and/or acceleration of the door movement, and the like. FIG. 6 illustrates an example of the radar sensor 214 detecting a movement (e.g., along the z-axis 302) outside of the range within the operational parameters 218.

The radar sensor 214 may detect when a distance 604 is less than a remaining known closing distance 606. For example, the remaining known closing distance 606 may be tracked by an amount of movement already traveled and a known distance from open to close. For example, the movement sensor 210 may detect how far the door 102 has traveled. The radar sensor 214 may detect a distance remaining to the floor.

However in FIG. 6, an object 602 may be below the door 102. The radar sensor 214 may detect that the distance 604 to the object 602 is less than the remaining known travel distance 606 to close the door. In response, the door monitoring sensor 104 may transmit a signal to stop the motor 110.

In another example, one side of the door 102 may come out of the track 114. As a result, the door may close very slowly due to increased friction or decreased mobility. The door monitoring sensor 104 may detect that the speed of the door 102 is outside of the velocity range and generate an alarm. In another example, if the door 102 suddenly drops and the acceleration falls outside of the acceleration range (e.g., one of the panels 108 is disconnected from the door 102 and is in free fall), the door monitoring sensor 104 may generate an alarm.

In an example, the memory 216 may also include default positions for various errors or when movements fall outside of the operational range. For example, if one of the operational parameters 218 is violated and the door 102 is closing, the door monitoring sensor 104 may cause the door 102 to reverse to an open position. If one of the operational parameters 218 is violated and the door 102 is in the open position, the door 102 may remain open and temporarily block a close operation. If one of the operational parameters 218 is violated and the door 102 is in a closed position, the door 102 may be moved to an open position and temporarily block a close operation. If one of the operational parameters 218 is violated and the door 102 is opening, the door 102 may be allowed to continue moving to the open position and temporarily block the closing operation. It should be noted that these default positions are provided as examples, and that any logic may be implemented for a particular door, at a particular location, for a particular operation.

Figure 7:
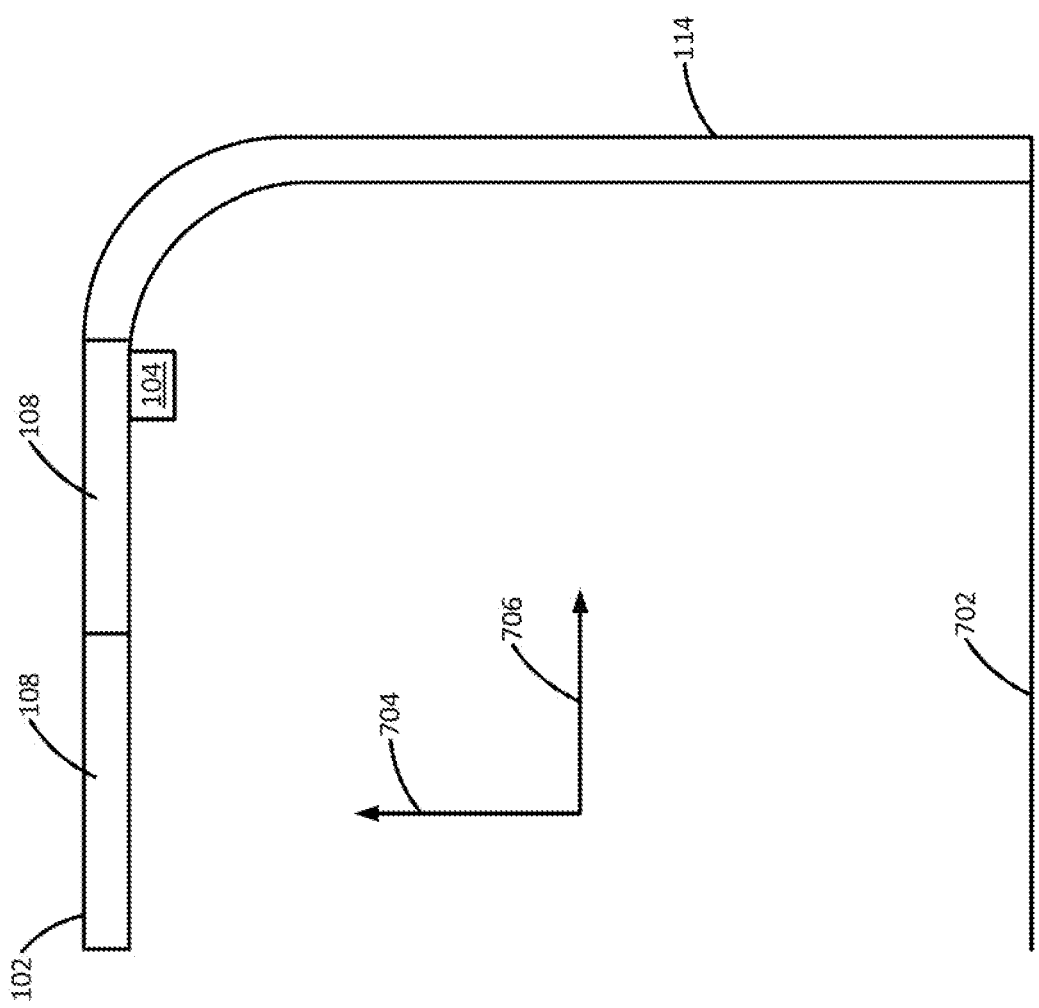
FIG. 7 is a block diagram of the example door monitoring sensor in an open position of the present disclosure.

In some examples, two or more of the sensors 208, 210, 212, and 214 may operate together for a particular logic operation of the door 102. FIG. 7 illustrates a side view of the door 102 to illustrate an example of the combinational logic of two or more of the sensors 208, 210, 212, and 214.

For example, the radar sensor 214 may continuously trigger alarms if the radar sensor 214 is active when the door 102 is in an open position. The radar sensor 214 may continuously detect moving objects or activity near the ceiling of the location. In addition, the battery 204 may recharge in a closed position. As a result, if the radar sensor 214 is continuously active in the open position, the radar sensor 214 may quickly drain the battery 204. With no battery power, the door monitoring sensor 104 may be deactivated when the door 102 is moving.

In an example, the movement sensor 210 may work in combination with the radar sensor 214 to disable the radar sensor 214 when the door 102 is in certain positions. For example, the movement sensor 210 may detect that the door 102 is parallel to a floor 702 (e.g., in an open position along a line 706). The processor 202 may disable the radar sensor 214 while the movement sensor 210 detects the open position.

At a later time, the door 102 may be closing. The movement sensor 210 may detect the movement along a direction perpendicular to the floor 702 (e.g., a direction along a line 704). In response, the processor 202 may activate the radar sensor 214.

It should be noted that other combinations of the sensors 208, 210, 212, and 214 may work together. For example, the level sensor 212 may work with the radar sensor 214 similarly. In another example, when the movement sensor 210 detects no movement, then the processor 202 may deactivate all of the other sensors 208, 212, and 214 to reduce consumption of the battery 204.

Figure 8:
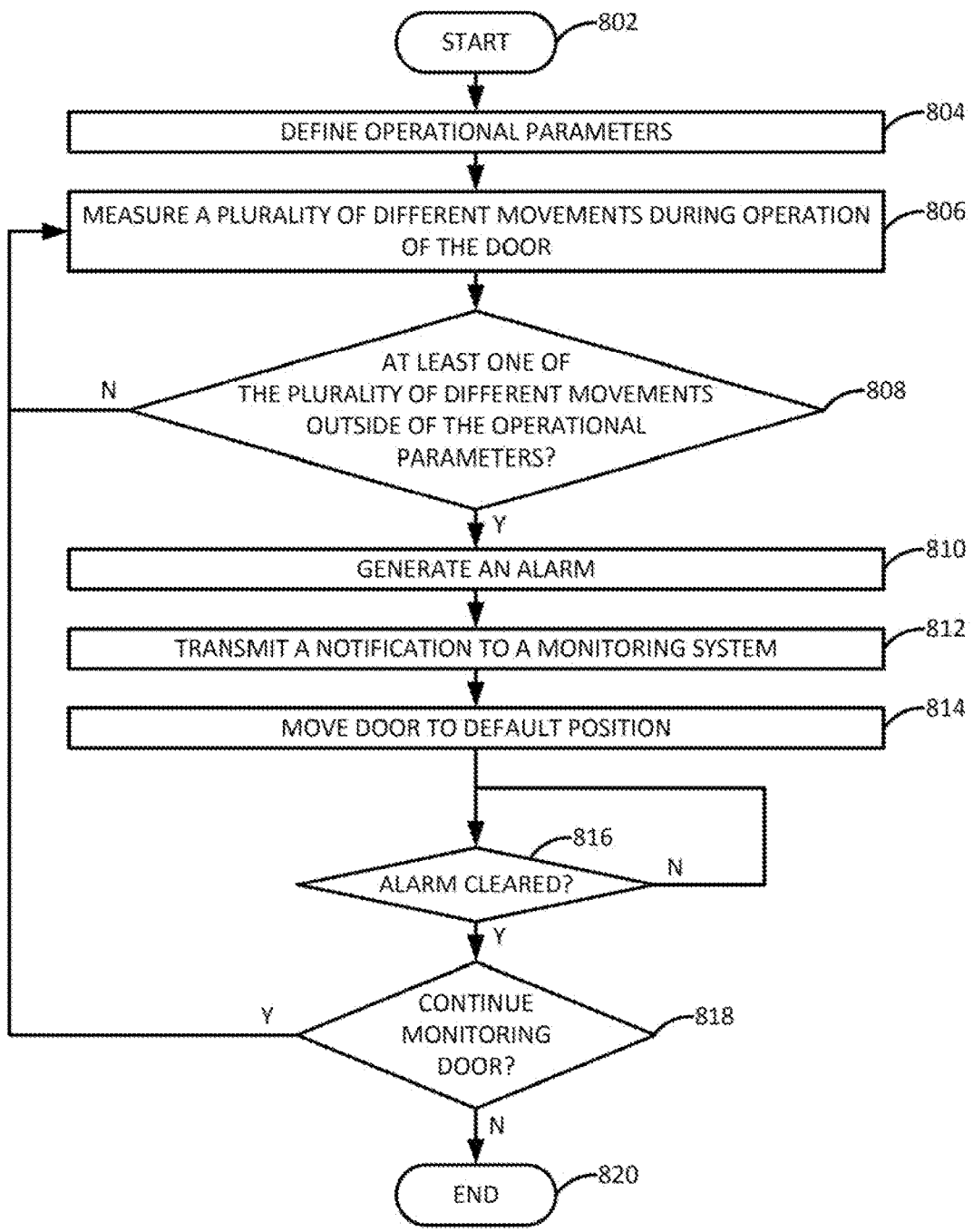
FIG. 8 is an example flowchart of a method for monitoring operation of a door using the door monitoring sensor of the present disclosure.

FIG. 8 illustrates a flow chart of an example method 800 for monitoring operation of a door using the door monitoring sensor of the present disclosure. The method 800 may be performed by the door monitoring sensor 104, illustrated in FIGS. 1 and 2 and described above.

At block 802, the method 800 begins. At block 804, the method 800 defines operational parameters. In an example, the operational parameters may be defined during an initialization process. The initialization process may include performing a plurality of opening and closing cycles of the door. A plurality of different movements of the door may be measured as the door is cycled open and closed.

In an example, the different movements may include six different movements. The six different movements may include movement along an x-axis, a y-axis, and a z-axis, as well as pitch, roll, and yaw. The x-axis, y-axis, and z-axis may be measured as a linear distance in millimeters, centimeters, inches, and the like. The pitch, roll, and yaw may be measured as an angular value in degrees of rotation.

In an example, the average value for each one of the plurality of different movements may be calculated to define the operational parameters of the door. A range of values may be used based off of the average value. For example, the range may include a low and high value, a standard deviation above and below the average value, a percentage above and below the average value, and the like.

At block 806, the method 800 measures a plurality of different movements during operation of the door. After the operational parameters are defined and the door is activated, the movements of the door may be monitored or measured by a door monitoring sensor. The movements of the door that are measured may be compared to the operational parameters.

At block 808, the method 800 determines if at least one of the plurality of different movements is outside of the operational parameters. For example, if the measurement of one of the movements of the door falls outside of the range for that movement, the movement may violate the operational parameters. If no movements fall outside of the respective operational parameters, then the answer to block 808 may be no. The method 800 may return to block 806.

In an example, if at least one of the movements falls outside of the range of the operational parameter for that movement, then the answer to block 808 may be yes. If the answer to block 808 is yes, the method 800 may proceed to block 810.

At block 810, the method 800 generates an alarm. In an example, the alarm may include a flashing signal light on the door monitoring sensor, an audible alarm, and the like. The alarm may be sent to a central monitoring system for display to a technician at the central monitoring system.

At block 812, the method 800 transmits a notification to a monitoring system. In an example, the notification may include the alarm from block 810. In an example, the notification may include information for a technician to clear the alarm. For example, the notification may include an identification of which door monitoring sensor and/or which door generated the alarm. The notification may include which movement was detected to be outside of the operational parameters. The notification may include a current status of the door (e.g., in a closed position, open position, stuck between open and closed, and the like). Thus, based on the information in the notification, the technician may attempt to fix the door and clear the alarm.

At block 814, the method 800 moves the door to a default position. In an example, when an alarm is generated, the door may move to the default position to prevent further damage and/or injury. In an example, the default position may be an open position and temporarily blocking a closing operation.

At block 816, the method 800 determines if the alarm is cleared. For example, a technician may fix the operation of the door or remove the force that was causing the door to move outside of the operational parameters. If the alarm is not cleared, the method 800 may continue to loop within the block 816. If the alarm is cleared, the method 800 may proceed to block 818.

At block 818, the method 800 determines whether or not to continue monitoring the door. For example, after the alarm is cleared, the door may be reactivated and the door monitoring sensor may continue to monitor operation of the door. If the answer to block 818 is yes, the method 800 may return to block 806.

If the answer to block 818 is no, the method 800 may proceed to block 820. For example, the door monitoring sensor may be deactivated for maintenance, repair, replacement, and the like. At block 820, the method 800 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A door monitoring sensor, comprising:
   a communication interface to transmit a communication when a door operates outside of operational parameters that are unique to the door;
   at least one sensor to detect various movements of the door;
   a power supply to provide power to the at least one sensor, wherein a housing of the door monitoring sensor comprises contacts that electrically connect to contacts of a power source when the door is in a desired position; and
   a processor communicatively coupled to the communication interface and the at least one sensor, wherein the processor is to:
      determine that the door is moving outside of the operational parameters of the door; and
      send a notification by the communication interface to a central monitoring system in response to a determination that the door is moving outside of the operational parameters that are unique to the door.

2. The door monitoring sensor of claim 1, wherein the at least one sensor comprises an angular sensor to measure a rotational movement of the door comprising pitch, roll, and yaw.

3. The door monitoring sensor of claim 1, wherein the at least one sensor comprises a gyroscope.

4. The door monitoring sensor of claim 1, wherein the at least one sensor comprises an accelerometer.

5. The door monitoring sensor of claim 1, wherein the at least one sensor comprises a level sensor.

6. The door monitoring sensor of claim 5, wherein the level sensor is to determine that the door is level.

7. The door monitoring sensor of claim 1, further comprising:
   a memory to store the operational parameters that are unique to the door, wherein the operational parameters that are unique to the door are defined during an initialization process that monitors a plurality of opening and closing cycles of the door.

8. The door monitoring sensor of claim 7, wherein the operational parameters that are unique to the door comprise an average of values recorded by the at least one sensor during the plurality of opening and closing cycles of the door.

9. The door monitoring sensor of claim 1, further comprising:
   a radar sensor to detect an object, wherein the processor is further to:
   deactivate the radar sensor when the at least one sensor detects that the door is in an open position.

10. A door system, comprising:
    a vertically rolling door, comprising a plurality of panels having wheels;
    a plurality of tracks to guide movement of the vertically rolling door via the wheels of the plurality of panels that roll inside of the plurality of tracks;
    a door barrel to wrap the vertically rolling door around the door barrel when the vertically rolling door is opened; and
    at least one door monitoring sensor to measure different rotational movements and a movement along an x-y-z coordinate plane of the vertically rolling door and to transmit a notification to a central monitoring system when at least one of six different movements is measured to be outside of unique operational parameters defined for the door system.

11. The door system of claim 10, wherein the at least one door monitoring sensor comprises:
    a power supply to power sensors of the at least one door monitoring sensor.

12. The door system of claim 10, wherein the at least one door monitoring sensor comprises:
    an angular sensor to measure the different rotational movements of the vertically rolling door comprising pitch, roll, and yaw.

13. The door system of claim 10, wherein the at least one door monitoring sensor comprises:
    a movement sensor to detect the movement along the x-y-z coordinate plane of the vertically rolling door.

14. The door system of claim 13, wherein the movement sensor comprises a level sensor that is used to determine that the vertically rolling door is level.

15. The door system of claim 10, further comprising a radar sensor to detect an object and to return the vertically rolling door to a default position when the object is detected while the vertically rolling door is closing.

* * * * *